US012722809B2

(12) United States Patent
Plante

(10) Patent No.: US 12,722,809 B2
(45) Date of Patent: Sep. 1, 2026

(54) SPACECRAFT THAT PROVIDES OPERATING RESOURCES FOR EXTERNALLY DOCKED MODULES

(71) Applicant: Rogue Space Systems Corporation, Laconia, NH (US)

(72) Inventor: Barbara Ann Plante, Hayward, CA (US)

(73) Assignee: Rogue Space Systems Corporation, Laconia, NH (US)

(*) Notice: Subject to any disclaimer, the term of this patent is extended or adjusted under 35 U.S.C. 154(b) by 0 days.

(21) Appl. No.: 18/927,734

(22) Filed: Oct. 25, 2024

(65) Prior Publication Data

US 2025/0136303 A1 May 1, 2025

Related U.S. Application Data

(60) Provisional application No. 63/593,288, filed on Oct. 26, 2023.

(51) Int. Cl.
*B64G 1/64* (2006.01)

(52) U.S. Cl.
CPC .................................... *B64G 1/646* (2013.01)

(58) Field of Classification Search
CPC ............. B64G 1/646; B64G 1/64; B64G 1/66
See application file for complete search history.

(56) References Cited

U.S. PATENT DOCUMENTS 3,910,533 A * 10/1975 Cheatham ............ B64G 1/6462 244/172.4
5,299,764 A 4/1994 Scott
5,350,138 A * 9/1994 Culbertson .............. B64G 1/14 244/159.6

(Continued)

FOREIGN PATENT DOCUMENTS

CN 110182388 A * 8/2019 ............... B64G 1/22

OTHER PUBLICATIONS

ESA European Users Guide to low Gravity Platforms).*
Wayback Machine Date for ESA document.*
English Translation Description CN110182388A.*

*Primary Examiner* — Assres H Woldemaryam
(74) *Attorney, Agent, or Firm* — Steven Wood; Vela Wood Staley Young P.C.

(57) ABSTRACT

The method and the system of this invention center around the innovative concept of an orbit-independent spacecraft comprised of a physical structure that provides multiple docking devices placed in a spatial relationship and orientation on the exterior of the spacecraft. The docking devices provide a standard interface to the spacecraft by which to attach and detach modular components (payloads). Payloads to be docked to the spacecraft have identical docking devices as part of their physical assemblies. A payload that has been launched into space is navigated towards the spacecraft using a transfer vehicle. Payload and spacecraft docking devices are brought into physical contact where internal locking mechanisms create a secure attachment of the payload to the spacecraft. Physical connections within the payload and spacecraft docking devices are made, allowing the payload to access bus capabilities such as electrical power, data communications, sensor readings, and thermal management from the spacecraft.

14 Claims, 7 Drawing Sheets

(56) References Cited

U.S. PATENT DOCUMENTS 5,806,799 A * 9/1998 Lounge .................... B64G 1/60 244/159.4
6,206,328 B1 * 3/2001 Taylor ...................... B64G 1/12 244/159.6
6,299,107 B1 * 10/2001 Kong ................... B64G 1/6464 244/172.4
6,354,540 B1 * 3/2002 Lewis .................. B64G 1/6462 244/172.4
6,669,148 B2 * 12/2003 Anderman ........... B64G 1/2427 244/172.4
7,070,151 B2 * 7/2006 D'Ausilio .............. B64G 1/503 244/171.1
7,163,179 B1 * 1/2007 Taylor .................. B64G 1/1078 244/159.4
7,216,833 B2 * 5/2007 D'Ausilio .............. B64G 1/503 244/171.1
7,216,834 B2 * 5/2007 D'Ausilio .............. B64G 1/413 244/172.5
10,131,452 B1 * 11/2018 Rohweller ........... H01Q 1/1235
10,279,933 B2 * 5/2019 Lakshmanan ............ B64G 1/64
10,850,869 B2 12/2020 Nicholson et al.
11,053,031 B2 * 7/2021 Liu ...................... B64G 1/6462
11,560,243 B2 * 1/2023 Johnson ............... B64G 1/6462
11,827,386 B2 * 11/2023 Michel ................. B64G 1/6462
12,037,142 B2 * 7/2024 Faber ..................... B64G 1/646
2004/0031885 A1 * 2/2004 D'Ausilio .............. B64G 1/503 244/171.1
2008/0296436 A1 * 12/2008 D'Ausilio ............ B64G 1/4024 244/171.1
2014/0151509 A1 * 6/2014 Zelon ..................... B64G 1/646 244/158.9
2014/0319282 A1 * 10/2014 Bigelow .................. B64G 1/12 244/159.4
2016/0207641 A1 * 7/2016 Myers .................. B64G 1/2227
2017/0259946 A1 * 9/2017 White, Jr. .............. B64G 1/403
2018/0297724 A1 * 10/2018 Harvey .................. B64G 1/223
2022/0371751 A1 * 11/2022 Faber .................... B64C 39/024

* cited by examiner

SPACECRAFT THAT PROVIDES OPERATING RESOURCES FOR EXTERNALLY DOCKED MODULES

CROSS REFERENCE TO RELATED APPLICATION

This application is a non-provisional of and claims the benefit under 35 U.S.C. § 119(e) of the earlier filing date of U.S. Provisional Application Ser. No. 63/593,288, filed on Oct. 26, 2023, which is hereby incorporated in entirety by reference.

FIELD OF INVENTION

The present invention relates to a spacecraft that can accommodate the external docking and undocking of modules (payloads). Particularly, the invention relates to a spacecraft that is capable of providing operating resources to docked payloads in the form of electrical power, data communications, access to on-board sensor data, and thermal management. Additionally, the payloads benefit by shared utilization of the regulatory licensing authority assigned to the spacecraft to take earth imagery and transmit data to earth stations.

BACKGROUND

In recent years, an increasing number of spacecraft have been launched into Earth orbit. Presently, the rise in commercial activity has resulted in roughly three non-working spacecraft to every working one, resulting in more than 19,800 dead space objects. This increase in orbital debris contributes to the likelihood of in-orbit collisions and liabilities to operational spacecraft, especially in Low Earth Orbit (LEO). Measures must be taken to effectively manage the near Earth environment in order to maintain operational viability.

Further contributing to liabilities in LEO is the mismatch between the operational needs of modern spacecraft and design conventions of single purpose spacecraft (SPS). Modern space operations demand high technology refresh rates, relatively short spacecraft life, low cost, and increased data throughput. This shift is partly due to the expansion of end users of LEO assets. Previous missions that were primarily driven by experimental technologies, science, and defense objectives are now engulfed by commercial demand for data; Internet of things (IoT), broadband, earth observation, etc.

In line with the operational requirements of many modern LEO spacecraft, private sector priorities in spacecraft development have shifted from high reliability and risk aversion to greater risk tolerance. As such, spacecraft developers are focusing more program resources to payloads rather than to the spacecraft support systems, which are known as the spacecraft bus. This is the case although more than 70% of the mass of a spacecraft is made up of bus components; propellant tanks, fuels, structures, communications equipment, solar panels, batteries, computers, sensors, actuators and thermal management components.

The fallacy of the higher risk tolerance approach is demonstrated in the measured success rates of modern small spacecraft missions. For small spacecraft launched between 2002-2016, 69% do not achieve their mission objectives due to various failures. Presently there are no viable methods for fixing these failed spacecraft previously launched into space.

SUMMARY

The following summary of the present invention is presented to provide a basic understanding of some aspects of the invention and to facilitate an understanding of some of the innovative features unique to the disclosed embodiment, and it is not intended to be a full description. This summary is not intended to identify all key or critical elements of the invention or to delineate the entire scope of the invention or the present claims. Its sole purpose is to present some concepts of the invention in a simplified form as a prelude to the more detailed description presented below. A full appreciation of the various aspects of the embodiments disclosed herein can be gained by taking the entire specification, claims, drawings, and abstract as a whole.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

It is, therefore, one aspect of the disclosed embodiments to provide a spacecraft that is capable of providing operating resources, including electrical power, data communications, access to on-board sensor data, and thermal management to payloads capable of docking and undocking with the spacecraft.

Currently, space missions are designed to use a single spacecraft that typically carries one payload. In these single purpose spacecraft, the payload and all of the required support systems, known as the spacecraft bus, are integrated within a single structure and launched to space. The present invention improves on the state of the art by conceptually and physically separating the payload from the spacecraft bus. Payloads are operated on the outside of the spacecraft instead of the inside. Bus functions are implemented in the spacecraft, which provides resources to payloads through docking devices.

The method and the system of this invention center around the innovative concept of a spacecraft, comprised of a physical structure or truss, that provides multiple docking devices. The docking devices are placed in a spatial relationship and orientation on the exterior of the spacecraft. The docking devices provide a standard interface to the spacecraft by which to attach and detach modular components (payloads). Payloads to be docked to the spacecraft have an identical docking device as part of their physical assembly. A payload that has been launched into space is navigated towards the spacecraft using a transfer vehicle. The payload and spacecraft docking devices are navigated into physical contact and locking mechanisms create a secure attachment of the payload to the spacecraft. Physical connections within the payload and spacecraft docking devices are made, allowing the payload to access bus capabilities such as electrical power, data communications, sensor readings, and thermal management from the spacecraft.

Before launch into space, components responsible for management of the spacecraft such as on-board computers, sensors, actuators, mechanisms, batteries, thermal control and radio/optical communications devices are attached to the spacecraft using the docking devices. Other payloads that perform specific mission oriented tasks such as remote sensing, data communications, science research, and navigation can be docked to the spacecraft before launch, as much as space and weight limitations of the launch vehicle allow.

Once in space, spacecraft solar panels are extended and generate electrical energy for storage in the batteries. Battery power is routed through the truss' internal physical conduit to the spacecraft management payloads. Spacecraft software manages the startup, operation and monitoring of all resident payloads.

Payloads completed after the spacecraft is in space can be fitted with a docking device, launched, and navigated to the spacecraft. The new payload is navigated to an unpopulated docking location and docked in order to access spacecraft resources. The method of this invention allows spacecraft management payloads that require a technology refresh or that fail on orbit to be replaced in the same manner as any payload, resulting in the extension of the usable lifetime of the spacecraft. Payloads that no longer require spacecraft resources are detached at the docking device and are moved away from the spacecraft for disposal.

The invention accommodates a number of payloads that would otherwise be launched as single purpose satellites. The invention helps decrease the number of free flying space objects, which helps mitigate the potential of collisions and the generation of space debris.

The invention can be launched into any orbit, providing greater operational flexibility for payloads than the current payload locations available on the International Space Station (ISS), which operates in a somewhat restricted orbit.

These and other aspects of the present invention are realized in an improved spacecraft as shown and described in the following figures and related description. Additional features and advantages of the invention will be set forth in the below detailed description, which, taken in conjunction with the accompanying exemplary drawings, together illustrate the features of the present invention, which will become apparent to those skilled in the art or through practice of the invention.

BRIEF DESCRIPTION OF THE FIGURES

The accompanying figures are provided for purposes of illustration only and merely depict typical or example embodiments. These drawings are provided to facilitate understanding and shall not be considered limiting of the breadth, scope, or applicability the various embodiments described herein.

Non-limiting and non-exhaustive features will be described with reference to the following figures, wherein reference numerals within the detailed description refer to identical or functionally-similar elements or parts throughout the various figures.

The figures described below were not intended to be drawn to any precise scale with respect to size. angular relationship, or relative position. Various embodiments of non-limiting and non-exhaustive examples of the present invention are shown and described with reference to the following figures.

Figure 1:
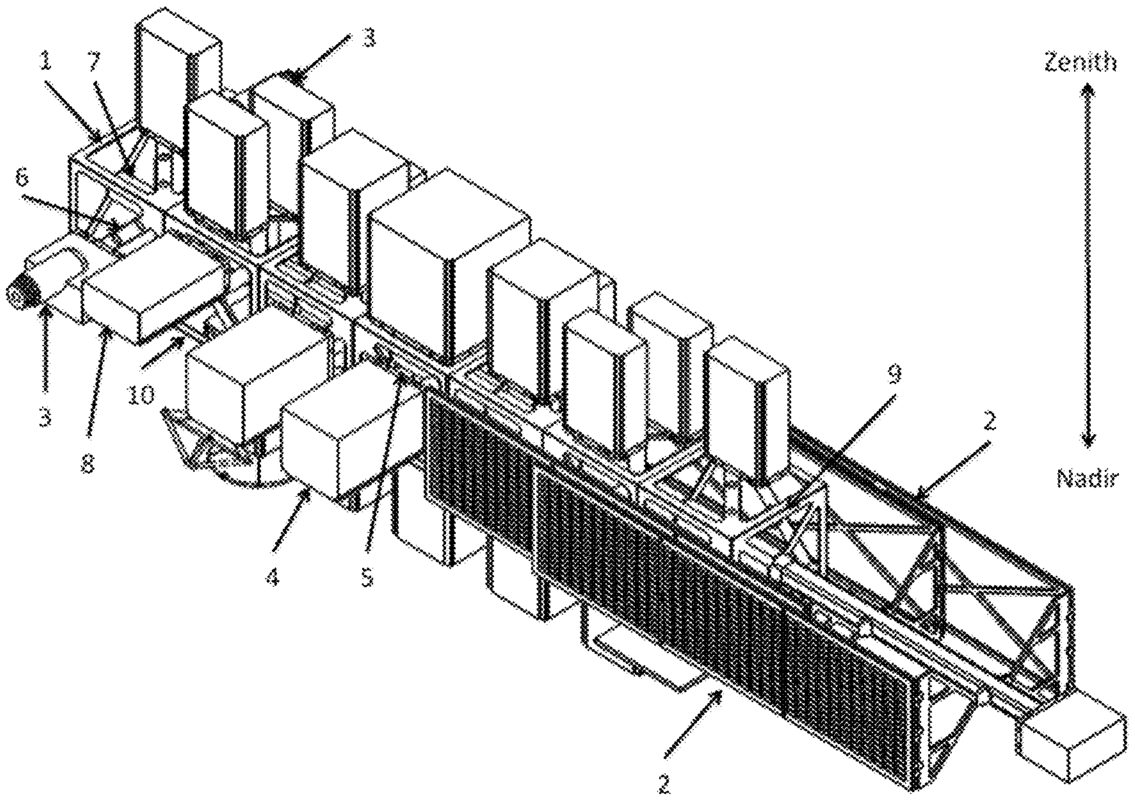

FIG. 1 illustrates the method and system of this invention showing a simplified isometric view diagram of the spacecraft in a stowed configuration with solar arrays folded down to the spacecraft structure, extendable booms retracted and payloads mounted to the structure.

Figure 2:
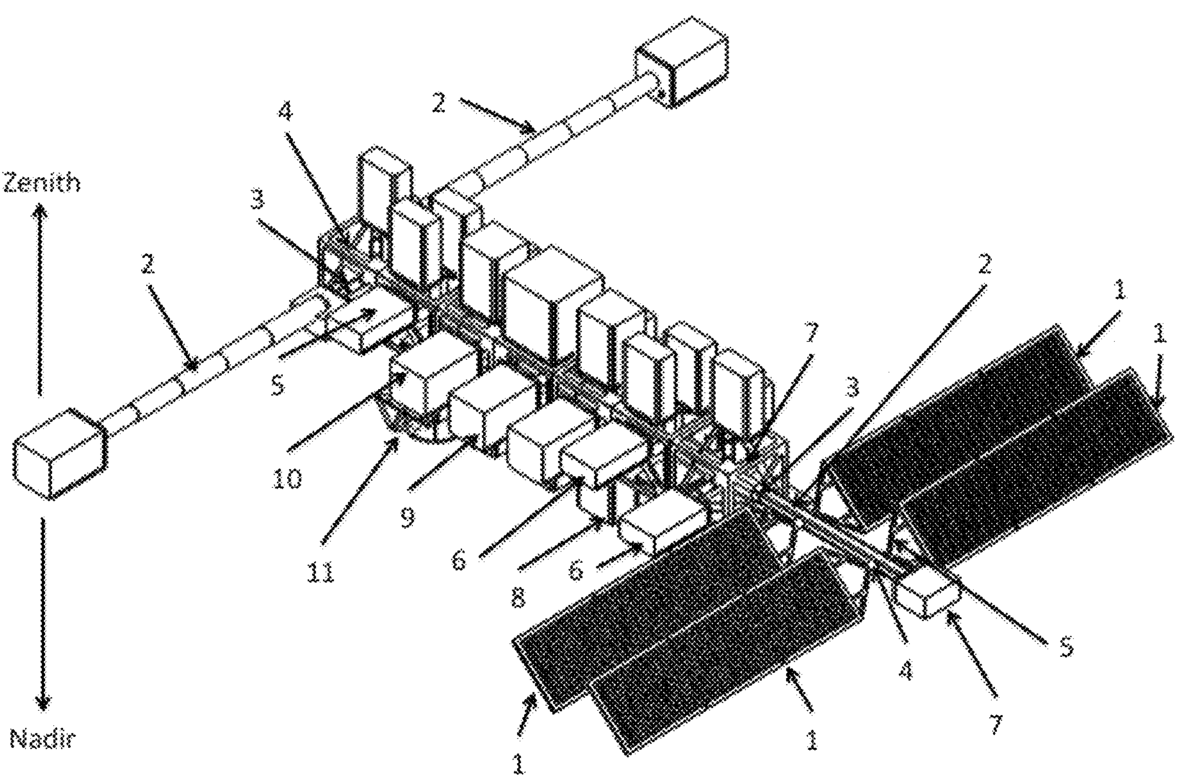

FIG. 2 illustrates the method and system of this invention showing a simplified isometric diagram of the spacecraft in a deployed configuration with solar panels deployed making room for additional payloads, and booms extended.

Figure 3:
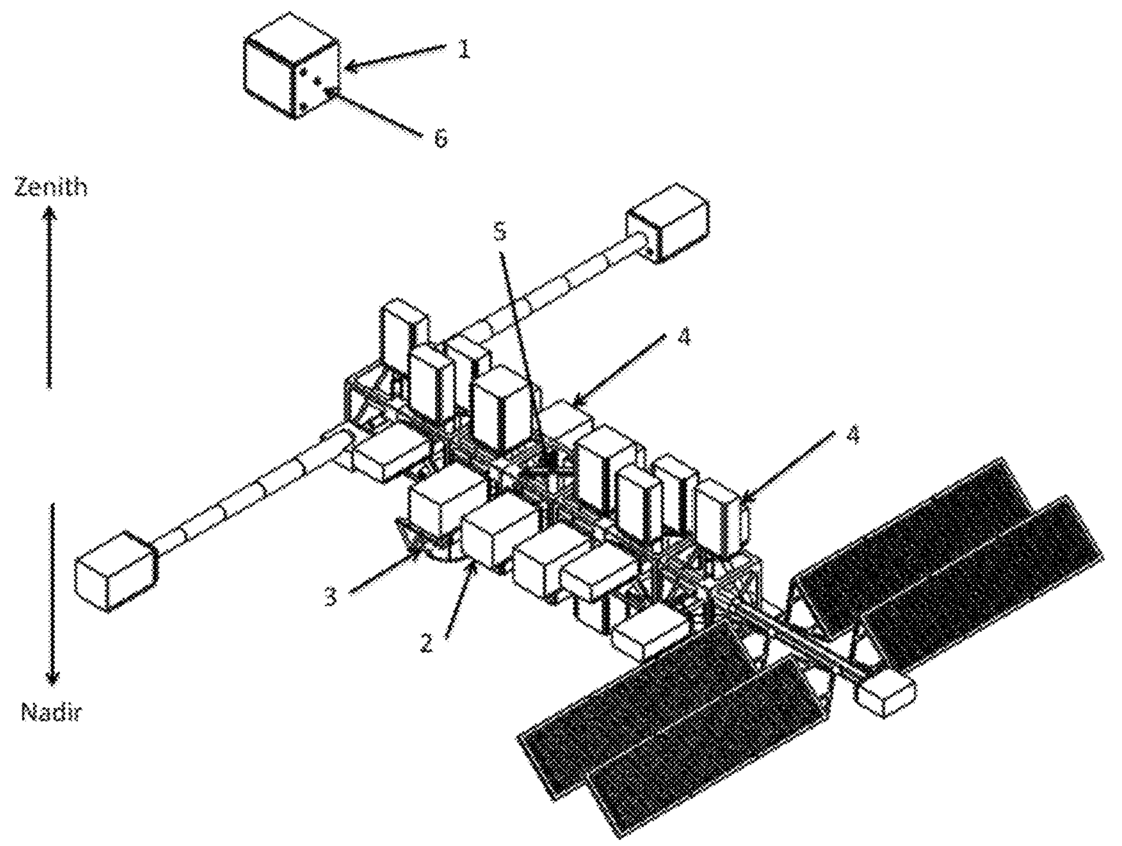

FIG. 3 illustrates the method and system of this invention showing a simplified isometric diagram of the spacecraft in a deployed configuration, shown with a payload approaching for docking.

Figure 4:
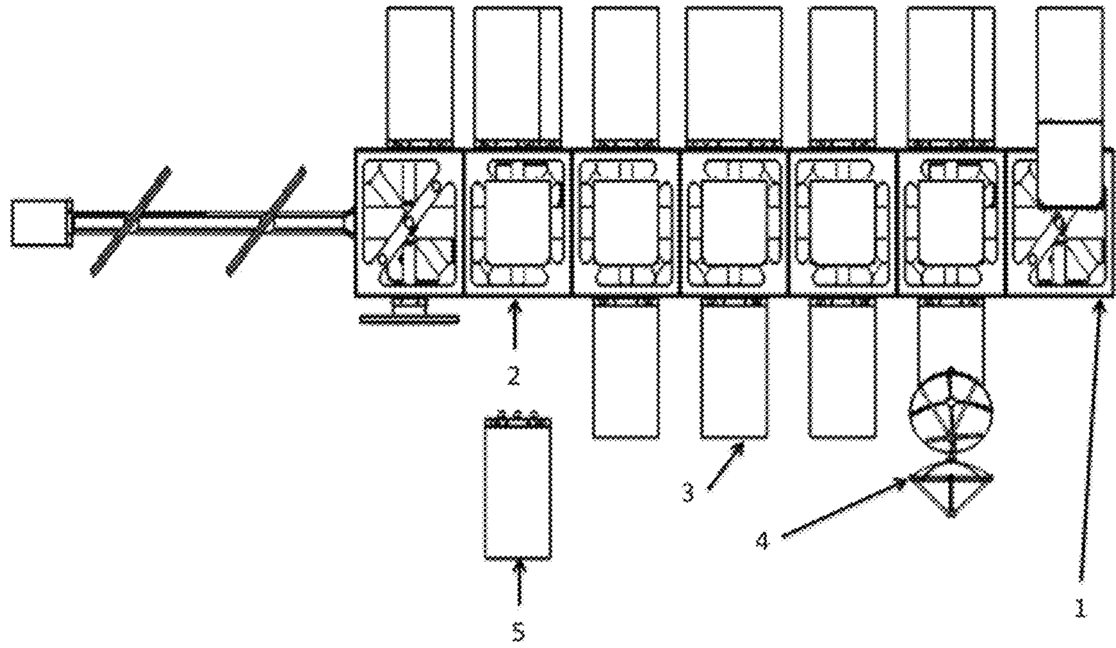

FIG. 4 illustrates the method and system of this invention showing a simplified diagram of a side view of the spacecraft, shown with a payload that has been undocked for disposal.

Figure 5:
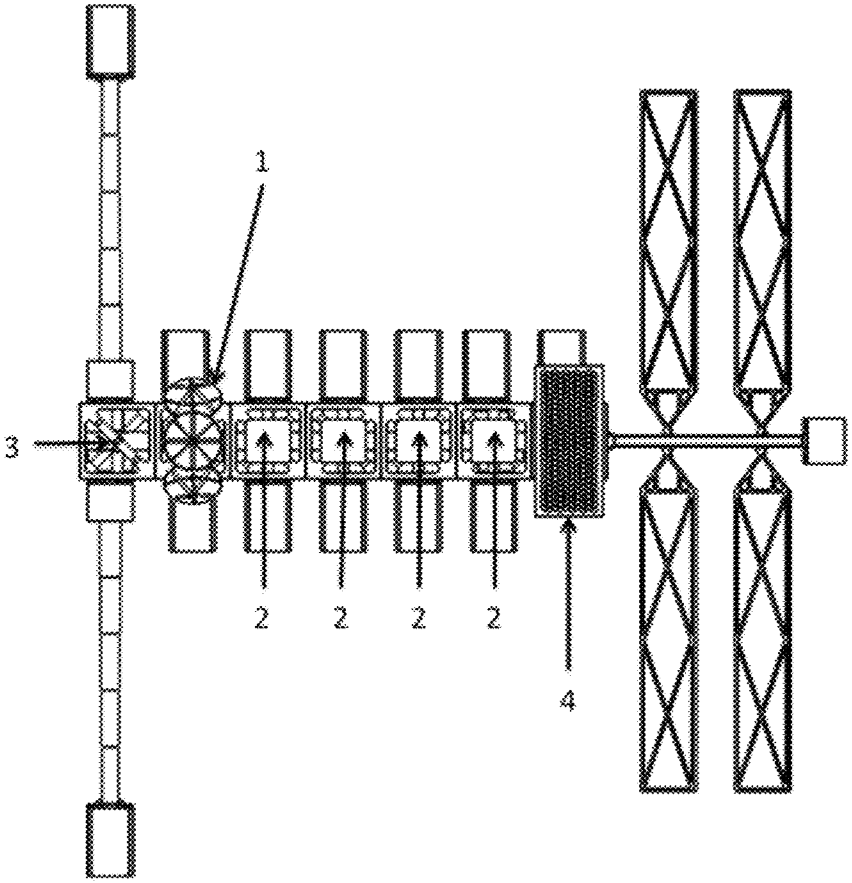

FIG. 5 illustrates the method and system of this invention showing a simplified diagram of the bottom (nadir pointing) view of the spacecraft showing spacecraft to ground communications hardware.

Figure 6:
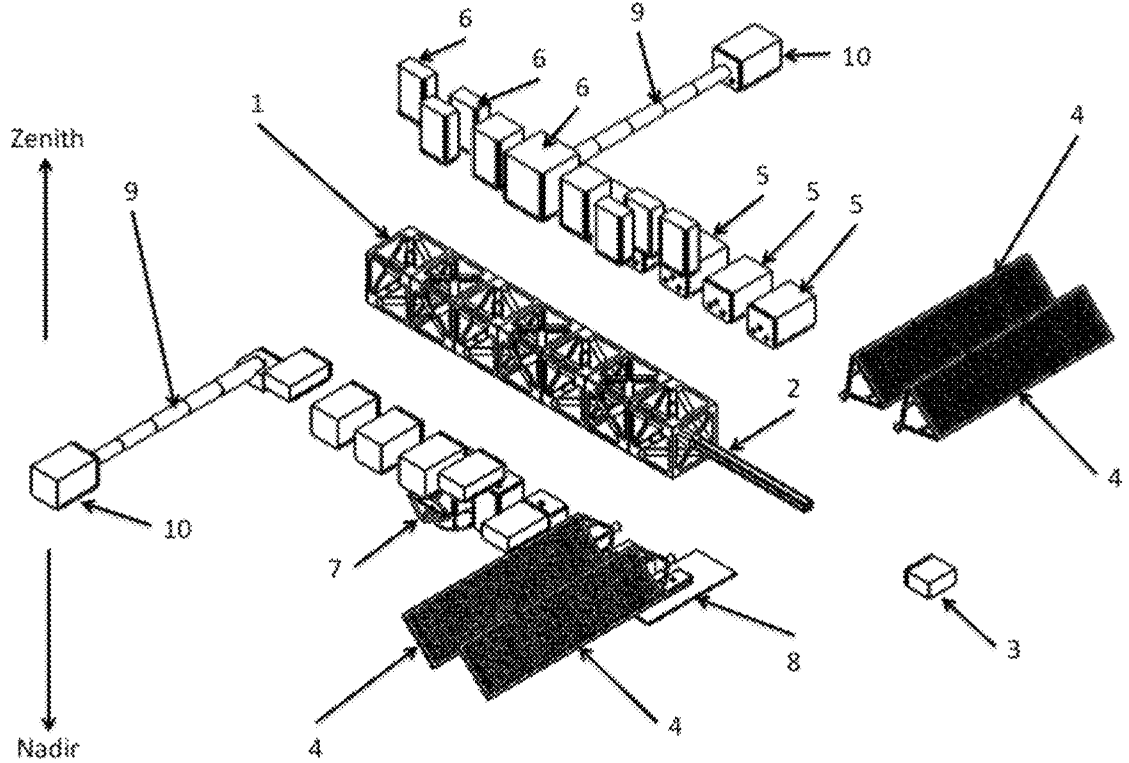

FIG. 6 illustrates the method and system of this invention showing a simplified diagram of the exploded isometric view of the spacecraft showing major components.

Figure 7:
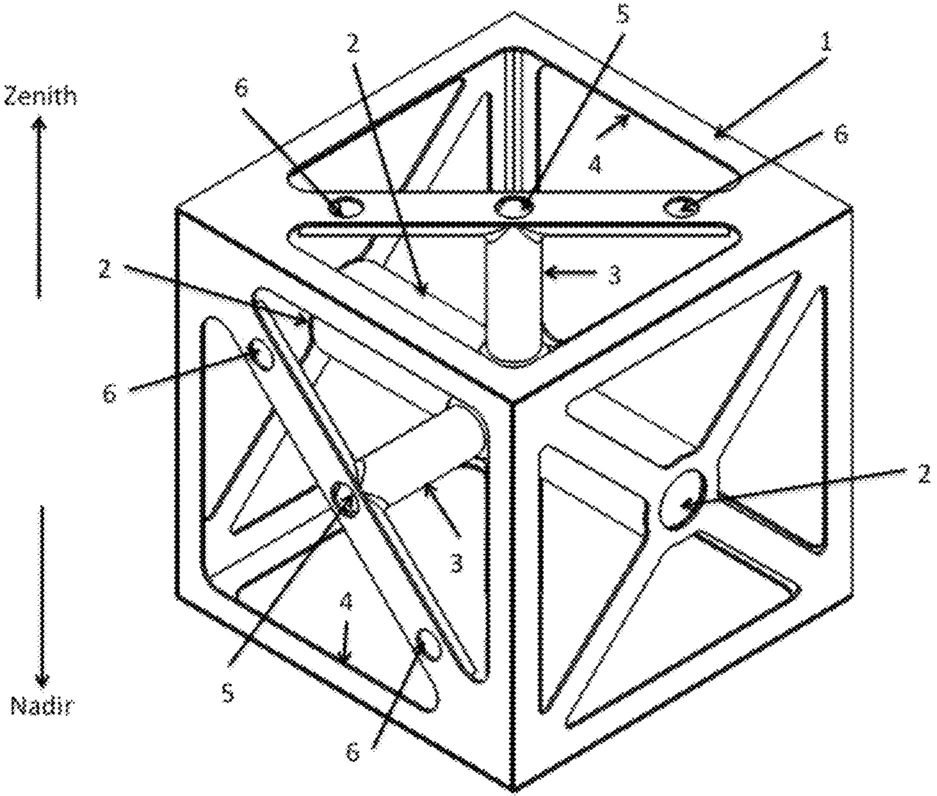

FIG. 7 illustrates the method and system of this invention showing a simplified diagram of a structural unit of the spacecraft structure with power and data conduits.

It will be appreciated that the figures are illustrative and not limiting of the scope of the invention, which is defined by the appended claims. The embodiments shown accomplish various aspects and objects of the invention. It is appreciated that it is not possible to clearly show each element and aspect of the invention in a single figure, and, as such, multiple figures are presented to separately illustrate the various details of the invention in greater clarity.

Similarly, not every embodiment need accomplish all advantages of the present invention. The figures are not intended to be exhaustive or to limit the embodiments to the precise form disclosed. It should be further understood that various embodiments may be practiced with modification and alteration.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms. Throughout the entirety of the present disclosure, use of the articles "a", "an", and "the" to modify a noun may be therefore understood to be used for convenience and to include one, or more than one of the modified noun, unless specifically stated or the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

As used herein, the term "set" may refer to any collection of elements, whether finite or infinite. The term subset may refer to any collection of elements, wherein the elements are taken from a parent set; a subset may be the entire parent set. The term proper subset refers to a subset containing fewer elements than the parent set.

As utilized herein the terms "module" and/or "assembly" generally refer to a collection of elements and/or routines (and/or subroutines) and/or data structures that performs a particular task or implements a particular action. The terms "module" and/or "assembly" may also refer to a self-contained component sub-system that can provide a complete function to a larger system and can be interchanged with other modules or assemblies that perform similar functions.

Additionally, it will be appreciated that a "module" or "assembly" may comprise software, hardware, firmware, and/or circuitry. In one example, one or more software programs comprising instructions capable of being executed by a processor may perform one or more of the functions of the modules described herein. In another example, circuitry may perform the same or similar functions.

Alternative embodiments may comprise more, less, or functionally equivalent modules and/or assemblies and still be within the scope of present embodiments. For example, the functions of the various modules may be combined or divided differently. Various embodiments are described herein as examples. It will be apparent to those skilled in the art that various modifications may be made and other embodiments can be used.

As will be appreciated by one skilled in the art, the present invention can be embodied as a device, system, or method, e.g., a data processing system or computer program product. Accordingly, the present invention may take the form of an entirely hardware embodiment, an entirely software embodiment, and/or an embodiment combining software and hardware aspects.

Furthermore, the present invention may take the form of a computer program product on a non-transitory computer-readable storage medium storing such computer-readable program code. Any suitable computer readable medium may be utilized whether now known or hereafter devised, including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages. such as the "C" programming language or in a visually oriented programming environment. such as, for example, Visual Basic. The program code may execute entirely on a local connected computer, as a stand-alone, cloud-based software program, and/or partially on the local connected computer, partially on a remote/networked (e.g., cloud) computer, and/or entirely on the remote/networked computer.

The present invention comprises improved devices, systems, and methods for providing and enabling an new modular attachments and release systems for space payloads and the supporting space-based infrastructure are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below. The particular configurations discussed in these non-limiting examples can be varied and are cited merely to illustrate at least one embodiment and are not intended to limit the scope thereof. The various embodiments of the invention will now be described more fully hereinafter with reference to the accompanying drawings, in which illustrative embodiments of the invention are shown so as to enable one skilled in the art to practice the present invention. These and other aspects and objects of the present invention will be better appreciated and understood when considered in conjunction with the following description and the accompanying drawings.

It should be understood, however, that the following description, while indicating preferred embodiments of the present invention and numerous specific details thereof, is given by way of illustration and not of limitation. The drawings and following description are exemplary of various aspects of the invention and are not intended to narrow the scope of the appended claims. Many changes and modifications may be made within the scope of the present invention without departing from the spirit thereof and the invention includes all such modifications.

The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention will now be described by referencing the appended figures representing preferred embodiments. Referring to FIG. 1, the spacecraft is shown in a stowed configuration according to various embodiments of the present invention. The stowed configuration consists of the structure 1 with solar panel assemblies 2 folded down and attached to the body of the spacecraft, and with the extendable booms 3 fully retracted. The spacecraft has payloads that perform control functions 4, and are securely attached to the structural units 1 via docking devices 5. The docking devices connect to the side 6 and main 7 power and data conduits. Power is provided to the main power conduit by a battery payload 8. Some payloads on the zenith deck 9 and nadir deck 10 can be included in the launch configuration, though not all available docking locations may be in use at that time.

According to various embodiments of the present invention, FIG. 2 depicts the spacecraft after the on-board flight software directs the deployment of the solar panels 1 and extension of the booms 2. The on-board flight software directs changes to spacecraft configuration by issuing commands that are routed through side data conduit 3 and main data conduit 4 to the desired control elements. The battery payload S receives electrical charge from the solar panels 1. conducted via the main power conduit 4 and side power conduits 3. The deployment of the solar panels 1 makes room for additional payload modules 6 along the sides of the spacecraft. The zenith deck 7 and nadir deck 8 can accommodate additional payload modules for attachment if the space was not utilized before launch. Sensor payloads 9 take readings and transmit the data through the side 3 and main 4 data conduits to on-board computer memory in the processor payload 10. There are multiple processor payload modules on the spacecraft for redundancy. Communication between earth-based ground stations and the spacecraft is conducted through gimbaled and fixed antenna payloads 11 via radio frequency (RF) links.

According to various embodiments of the present invention, FIG. 3 depicts a payload module 1 that has been launched into space and navigated to a safe distance from the spacecraft. On-board flight software within a control payload 2 receives ground station-initiated identification data for the payload module through the radio frequency (RF) communications pathway 3. Flight software validates the identity of the payload module 1, designates it as an acceptable docking candidate, and initiates payload-tracking and navigation activities using sensors 4. Flight software initiates radio communication 3 with the payload module 1, transmitting state information for an available docking location 5. The payload module 1 is navigated to the docking location 5 as directed by the spacecraft flight software. An initial contact between the payload module docking device 6 and the platform device 5 is detected with contact sensors. Locking mechanisms on both docking devices are engaged to complete the dock. Pre-marked fiducials on each device are examined to verify proper rotational alignment. The docking devices engage mechanisms that drive a mechanical mating of power and data connectors within each device that provide the payload module access to the spacecraft power and data infrastructure.

According to various embodiments of the present invention, FIG. 4 depicts a payload module that is docked to the spacecraft 1 at location 2. The flight software within the control payload 3 receives notification from an earth station through the radio frequency (RF) communications pathway 4 that the payload module can be released from its docked position for disposal. The docking devices within each device engage mechanisms that drive a mechanical de-mating of the power and data connector that provided the payload module access to the spacecraft power and data infrastructure. The locking mechanisms on both docking devices are disengaged to allow detachment. The spacecraft docking device engages actuators that contact the payload docking device, pushing it away from the platform for disposal 5.

According to various embodiments of the present invention, FIG. 5 depicts the spacecraft nadir deck view. Payloads 2 are connected to the nadir facing deck with docking devices, permitting access to spacecraft resources. Communication between earth-based ground stations and the spacecraft is conducted through gimbaled and fixed antenna payloads 1 over radio frequency (RF) links, commanding the release of payload 3. Docking site 3 is unpopulated and available to a payload. A phased array antenna 4 provides support for radar payloads.

According to various embodiments of the present invention. FIG. 6 depicts an exploded view showing the major elements of the spacecraft. The main power and data conduit 2 is attached to the structure 1 and protrudes from the structure to allow attachment of the solar array assemblies 4 and the sun sensor payload 3. Side mounting payloads 5 are shown with the docking device side facing the structure 1. Zenith pointing deck payloads are shown in 6. Gimbaled antenna payloads 7 and the phased array payload 8 are mounted to the nadir pointing deck. The collapsible booms 9 are shown extended to position magnetically sensitive payloads 10 away from the main body of the spacecraft.

According to various embodiments of the present invention, FIG. 7 depicts a single structural block 1 that comprises a unit section of the spacecraft structure or truss. The form of the structural block 1 is repeated along the length of the spacecraft structure. The main power and data conduit 2 passes through the block at the two main faces of the block and continues into adjacent blocks. Four side power and data conduits 3 connect to the main power and data conduit 2, permitting access to power and data communication services that are distributed throughout the spacecraft. The side power and data conduits 3 are orthogonal to the main power and data bus and terminate at the side faces 4. Docking devices 5 are positioned at the center of the four side faces of the structural block 1. Docking aids 6 monitor fiducials on the approaching payload to correct for rotational errors prior to docking.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

Although a number of implementations have been described, it will be understood that various modifications may be made without departing from the spirit and scope of the disclosure. Accordingly, other implementations are within the scope of the following claims. It should be understood that, although specific embodiments have just been described, the claimed subject matter is not intended to be limited in scope to any particular embodiment or implementation.

In the preceding description, various aspects of claimed subject matter may have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill in the art were omitted or simplified so as not to obscure claimed subject matter.

While certain features have been illustrated or described herein, many modifications, substitutions, or equivalents may not occur to those skilled in the art. It is, therefore, to be understood that the appended claims are intended to cover all such modifications or changes as fall within the true spirit of the claimed subject matter. Thus, it will be apparent from the foregoing that, while particular forms of the invention have been illustrated and described, various modifications can be made without parting from the spirit and scope of the invention.

What is claimed is:

1. A spacecraft structure comprising:

one or more trusses or platforms configured to host a plurality of components, payloads, and modules at various docking locations, each truss or platform having one or more main internal physical conduits that are configured to provide power distribution infrastructure, data communications links, and connections to available spacecraft resources to the plurality of components, payloads, and modules, and wherein each main internal physical conduit connects to one or more side conduits and terminates at the various docking locations;

a plurality of spacecraft docking devices present at the various docking locations on the one or more spacecraft trusses or platforms and configured to provide standard attachment and resource interfaces, to attach and detach to the plurality of components, payloads, and modules, to connect the plurality of components, payloads, and modules via one or more spacecraft docking device connections to the one or more internal physical conduits, and to provide fuel, power, external and on-platform data communications, sensor readings, thermal management and available spacecraft resources to the plurality of components, payloads, and modules via the spacecraft docking device connections to the one or more internal physical conduits of the one or more spacecraft trusses or platforms, wherein the plurality of components, payloads, and modules each have a corresponding docking device configured to attach to and detach from one or more of the plurality of spacecraft docking devices located on the one or more trusses or platforms.

2. The spacecraft structure of claim 1, wherein each of the one or more trusses or platforms comprises a unit section of the spacecraft structure that attaches to other trusses or platforms end-to-end, extending or repeating along the length of the spacecraft structure, wherein the one or more main internal physical conduits pass through each unit section at first and second ends to connect to and continue into adjacent unit sections, wherein the one or more side conduits connect orthogonally to the main internal physical conduit and terminate at one or more corresponding side faces, comprising the docking locations with spacecraft docking devices positioned at the center of each side face of the respective spacecraft unit section, wherein the plurality of spacecraft docking devices and the corresponding component, payload, and module docking devices each include one or more of contact sensors, pre-marked fiducials, locking mechanisms, and actuators, and wherein the plurality of spacecraft docking devices have docking aids configured to monitor fiducials and correct for rotational errors prior to docking and locking.

3. The spacecraft structure of claim 1, wherein one or more of the plurality of components, payloads, and modules comprise mission-critical components, payloads, and modules, including one or more of computers, sensors, batteries, thermal management and control, actuators, mechanisms, solar panel arrays, sun sensors, radio/optical communications, data communications, gimbaled and fixed antenna payloads, phased array antennas, radar payloads, collapsible booms, scientific research, navigation, propellant tanks, and propulsion systems, that are configured to be docked to one or more of the plurality of docking devices located on the one or more spacecraft trusses or platforms.

4. The spacecraft structure of claim 3, wherein the one or more main internal physical conduits protrude from the spacecraft structure to allow attachment to and connection with one or more solar array assemblies and sun sensor payloads, wherein one or more gimbaled antenna payloads and phased array payloads are mounted to a nadir pointing deck, and wherein one or more collapsible booms are configured to extend to hold electromagnetically sensitive components, payloads, or modules away from the spacecraft structure during operation.

5. The spacecraft structure of claim 1, wherein solar panel arrays comprising one or more of the plurality of components, payloads, and modules docked to one or more of the plurality of docking devices located on the one or more spacecraft structure trusses or platforms prior to launch of the spacecraft structure may obstruct one or more of the plurality of docking devices not docked to the solar panel arrays during launch, and reveal the previously blocked docking devices once the solar panel arrays are fully deployed and extended away from the spacecraft structure.

6. The spacecraft structure of claim 1, wherein the plurality of components, payloads, and modules are configured to receive communications and instructions for navigation and docking from the spacecraft structure, and one or more of the plurality of components, payloads, and modules is launched into outer space and configured to navigate to and rendezvous and dock with the spacecraft structure.

7. The spacecraft structure of claim 1, wherein the spacecraft structure includes a transfer vehicle configured to navigate one or more of the plurality of components, payloads, and modules between post-launch deployment and the spacecraft structure.

8. A modular spacecraft system comprising:

one or more trusses or platforms configured to host a plurality of modular components, payloads, and modules at various docking locations, each truss or platform having one or more main internal physical conduits that are configured to provide power distribution infrastructure, data communications links, and connections to available spacecraft resources to the plurality of modular components, payloads, and modules, and wherein each main internal physical conduit connects to one or more side conduits and terminates at the various docking locations;

a plurality of truss or platform docking devices present at the various docking locations on the one or more spacecraft trusses or platforms and configured to provide standard attachment and resource interfaces, to attach and detach to the plurality of modular components, payloads, and modules, to connect the plurality of modular components, payloads, and modules via one or more truss or platform docking device connections to the one or more internal physical conduits, and to provide fuel, power, external and on-platform data communications, sensor readings, thermal management and available spacecraft resources to the plurality of modular components, payloads, and modules via truss or platform docking device connections to the one or more internal physical conduits of the one or more spacecraft trusses or platforms, wherein the plurality of modular components, payloads, and modules each have a corresponding docking device configured to attach to and detach from one or more of the plurality of truss or platform docking devices.

9. The modular spacecraft system of claim 8, wherein each of the one or more trusses or platforms comprises a unit section of modular spacecraft system that attaches to other trusses or platforms end-to-end, extending or repeating along the length of modular spacecraft system, wherein the one or more main internal physical conduits pass through each unit section at first and second end faces to connect to and continue into adjacent unit sections, wherein the one or more side conduits connect orthogonally to the main internal physical conduit and terminate at one or more corresponding side faces, comprising the docking locations with truss or platform docking devices positioned at the center of each side face of the respective modular spacecraft system unit section, wherein the plurality of truss or platform docking devices and the corresponding component, payload, and module docking devices each include one or more of contact sensors, pre-marked fiducials, locking mechanisms, and actuators, and wherein the plurality of truss or platform docking devices have docking aids configured to monitor fiducials and correct for rotational errors prior to docking and locking.

10. The modular spacecraft system of claim 8, wherein one or more of the plurality of modular components, payloads, and modules comprise mission-critical components, payloads, and modules, including one or more of computers, sensors, batteries, thermal management and control, actuators, mechanisms, solar panel arrays, sun sensors, radio/optical communications, data communications, gimbaled and fixed antenna payloads, phased array antennas, radar payloads, collapsible booms, scientific research, navigation, propellant tanks, and propulsion systems, that are configured to be docked to one or more of the plurality of truss or platform docking devices located on the one or more spacecraft trusses or platforms prior to launch of the modular spacecraft system.

11. The modular spacecraft system of claim 10, wherein the one or more main internal physical conduits protrude from modular spacecraft system to allow attachment to and connection with one or more solar array assemblies and sun sensor payloads, wherein one or more gimbaled antenna payloads and phased array payloads are mounted to a nadir pointing deck, and wherein one or more collapsible booms are configured to extend to hold electromagnetically sensitive components, payloads, or modules away from the modular spacecraft system during operation.

12. The modular spacecraft system of claim 8, wherein solar panel arrays comprising one or more of the plurality of modular components, payloads, and modules docked to one or more of the plurality of truss or platform docking devices prior to launch of the modular spacecraft system may obstruct one or more of the plurality of truss or platform docking devices not docked to the solar panel arrays during launch, and unblock and reveal the previously obstructed one or more truss or platform docking devices when the solar panel arrays are fully deployed and extended away from the spacecraft.

13. The modular spacecraft system of claim 8, wherein the plurality of modular components, payloads, and modules are configured to receive communications and instructions for navigation and docking from the spacecraft system, and one or more of the plurality of modular components, payloads, and modules is launched into outer space and configured to navigate to and rendezvous and dock with a spacecraft.

14. The modular spacecraft system of claim 8, wherein the modular spacecraft system includes a transfer vehicle configured to navigate one or more of the plurality of modular components, payloads, and modules between post-launch deployment and a spacecraft.

* * * * *